United States Patent [19]

Sawdon

[11] Patent Number: 4,459,735
[45] Date of Patent: Jul. 17, 1984

[54] JOINING SHEET METAL

[75] Inventor: Edwin G. Sawdon, Marysville, Mich.

[73] Assignee: BTM Corporation, Marysville, Mich.

[21] Appl. No.: 495,440

[22] Filed: May 17, 1983

Related U.S. Application Data

[63] Continuation of Ser. No. 184,951, Sep. 8, 1980, abandoned.

[51] Int. Cl.³ .................. B21D 39/00; B23P 11/00
[52] U.S. Cl. ...................... 29/509; 29/522 A;
29/243.53; 29/283.5; 403/274
[58] Field of Search ............ 29/509, 522 R, 432,
29/522 A, 432.1, 283.5, 432.2, 243.5, 243.53;
227/18; 403/274, 393

[56] References Cited

U.S. PATENT DOCUMENTS

| | | | |
|---|---|---|---|
| 1,969,214 | 8/1934 | Dit Daude | 227/18 |
| 2,619,855 | 12/1952 | Williams | 29/432 UX |
| 2,671,361 | 3/1954 | Sandberg | 29/432 UX |
| 2,924,312 | 2/1960 | Williams | 29/509 UX |
| 3,338,463 | 8/1967 | Henrickson | |
| 3,357,388 | 12/1967 | Dunn | 29/509 X |
| 3,451,367 | 6/1969 | Henrikson | 29/509 UX |
| 3,579,809 | 5/1971 | Wolf | 29/509 |
| 3,771,216 | 11/1973 | Johnson | 29/509 |
| 4,208,776 | 6/1980 | Schleicher . | |

FOREIGN PATENT DOCUMENTS

| | | |
|---|---|---|
| 41-5589 | 3/1966 | Japan . |
| 42-14680 | 8/1967 | Japan . |
| 48-42707 | 12/1973 | Japan . |
| 895561 | 5/1962 | United Kingdom . |
| 945110 | 12/1963 | United Kingdom . |
| 1041119 | 9/1966 | United Kingdom . |
| 1101795 | 1/1968 | United Kingdom . |
| 1114826 | 5/1968 | United Kingdom . |
| 2069394A | 8/1981 | United Kingdom . |

Primary Examiner—Charlie T. Moon
Attorney, Agent, or Firm—Harness, Dickey & Pierce

[57] ABSTRACT

There is disclosed an improved apparatus for joining a plurality of pieces of sheet metal by first drawing and then laterally extruding the material to be joined into an enlarged shape which will permanently mechanically interlock the pieces. The apparatus utilizes a novel die construction in which portions thereof pivot laterally in response to lateral extrusion of the joining material, and is applicable to conventional "lanced" type joints as well as to a novel leakproof joint which is also disclosed. A method of forming a leakproof joint between a plurality of pieces of sheet metal is also disclosed.

7 Claims, 14 Drawing Figures

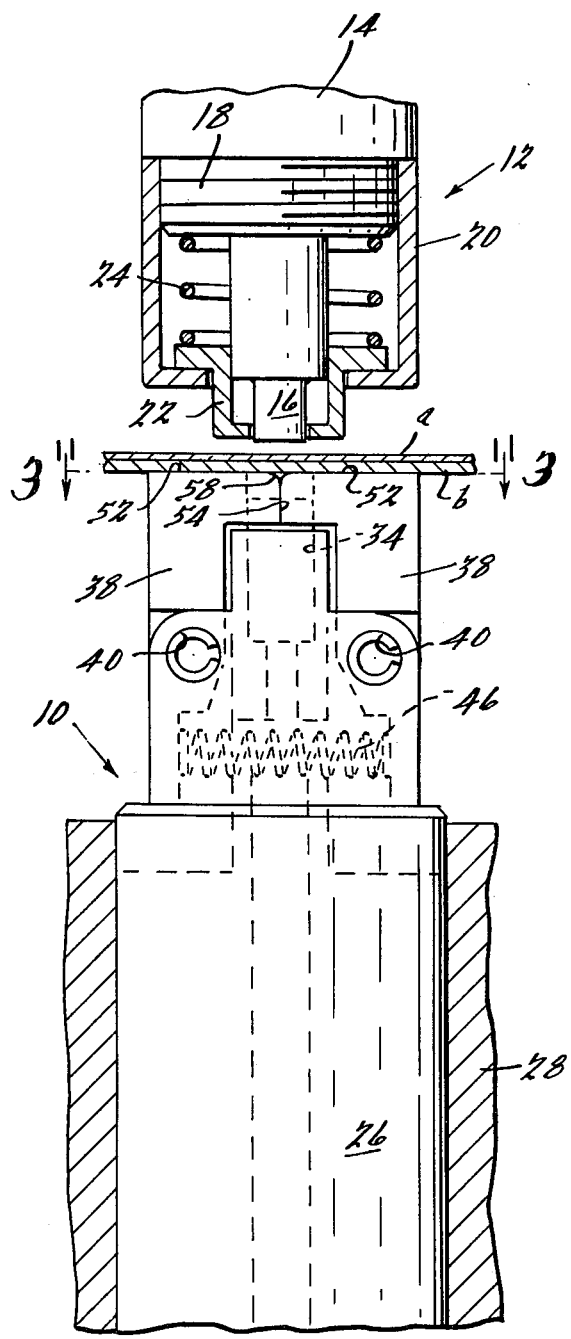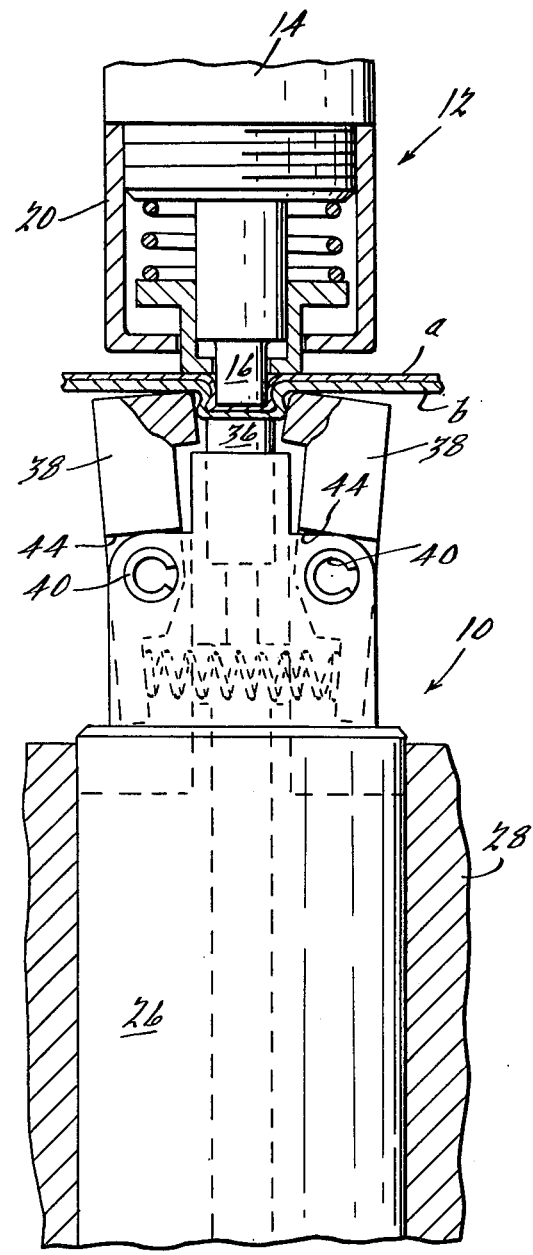

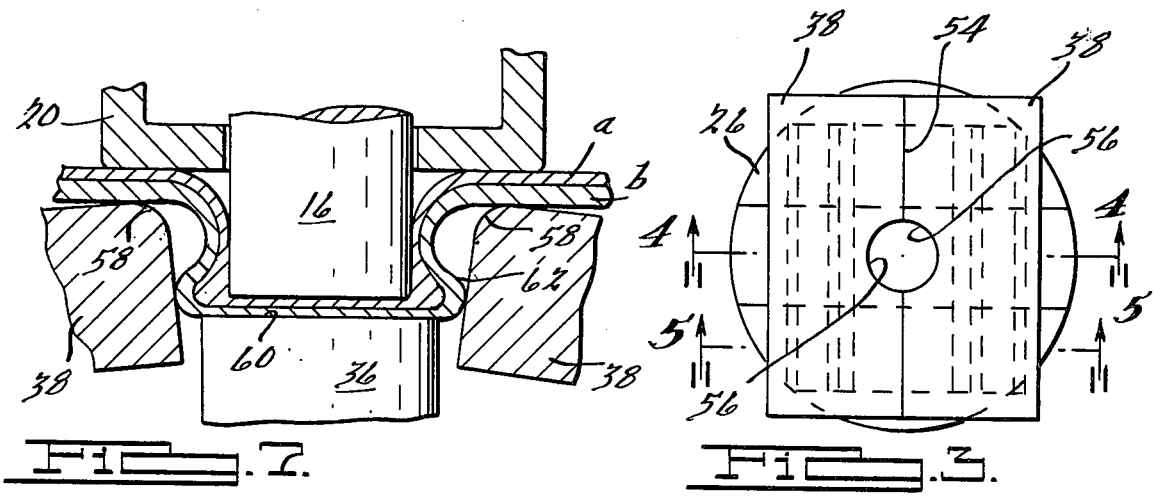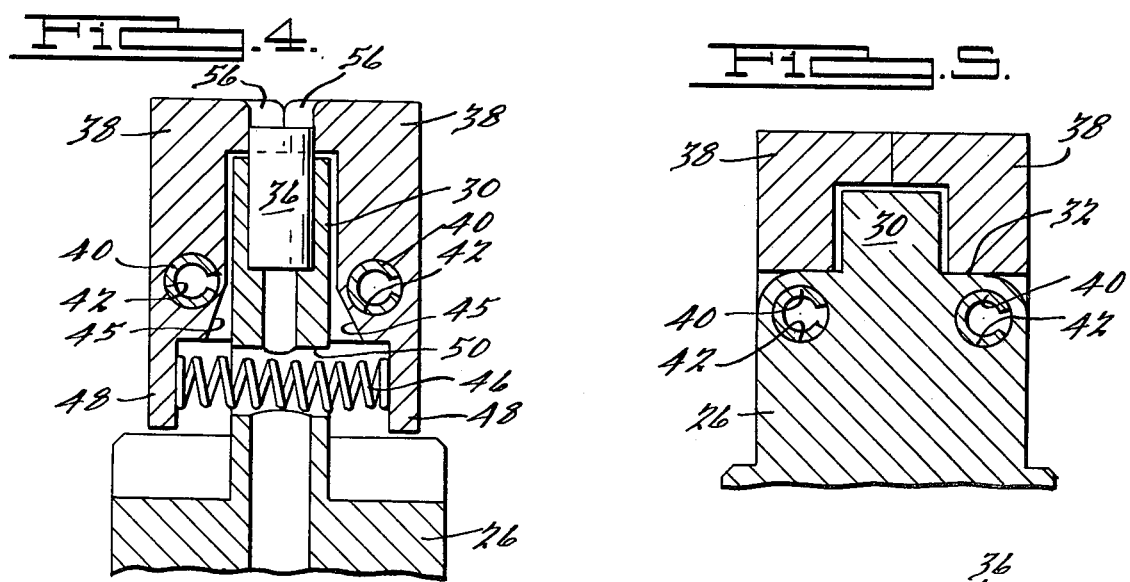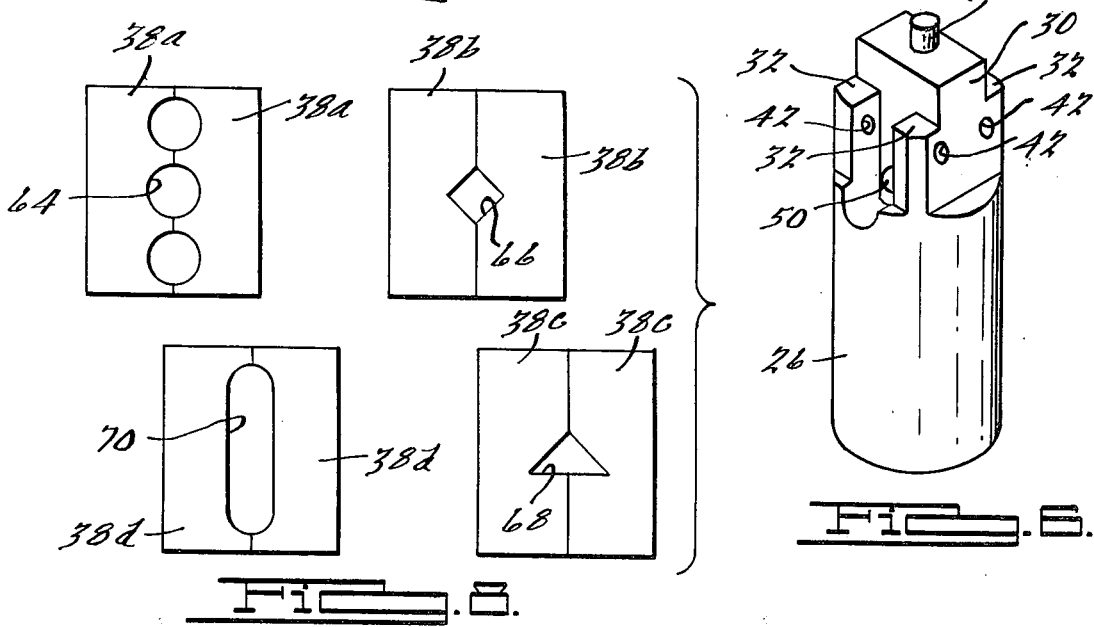

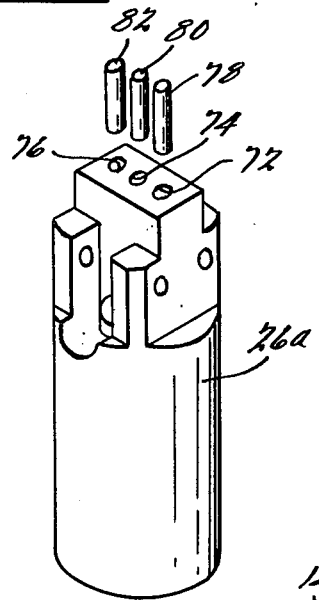
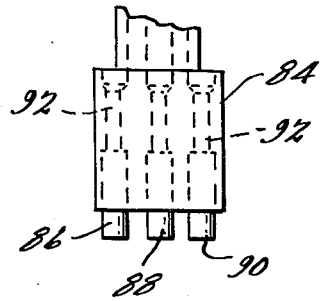
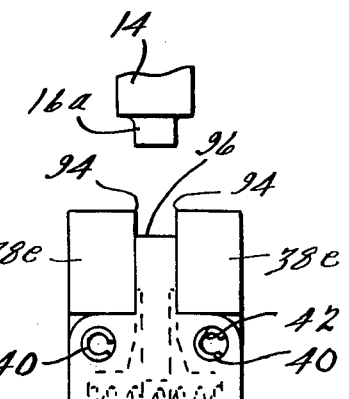
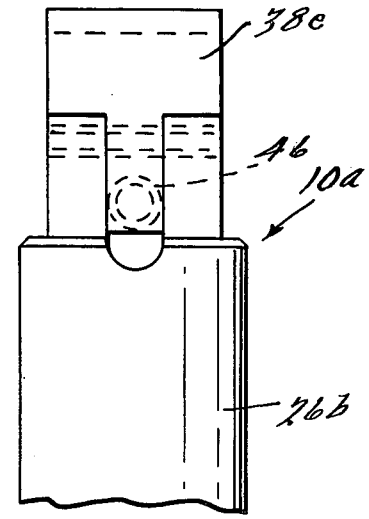
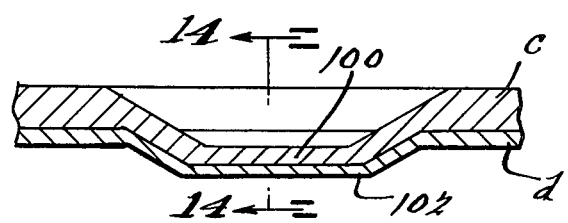
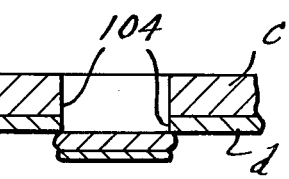

JOINING SHEET METAL

This is a continuation of application Ser. No. 184,951, filed Sept. 8, 1980, now abandoned.

BACKGROUND AND SUMMARY OF THE INVENTION

The present invention relates generally to joining sheet metal and more particularly to an apparatus for forming such joints, a method of forming such joints which are leakproof, and a leakproof joint.

Although it is old in the art to join a plurality of pieces of sheet metal by punching or otherwise manipulating same to cause them to be deformed into an interlocking relationship in a localized area, insofar as applicant is aware such joints necessarily require the shearing of material and hence are not suitable for leakproof applications (in the absence of some sealing material), and are destructive of the corrosion resistance of coated materials. Known apparatus is also relatively complex in design, often requiring powered actuation of both a punch and portions of the die, and utilizing expensively machined sliding die portions. This complexity increases the cost of the equipment, as well as the energy required for operation.

It is therefore a primary object of the present invention to provide an improved apparatus for permanently joining sheet metal which is capable of creating leakproof joints. Additional objects reside in the provision of such an apparatus which is relatively simple in construction (only a single punch need be actuated), can utilize a standard punch, requires very little power, is compact and hence usable in many different applications, creates a minimum amount of injury to coated materials being joined, thereby increasing corrosion resistance, and is suited for use as part of a small press or in C-frames holders which can be used in a larger press.

Another object of the present invention resides in the provision of an improved die assembly for use in sheet metal joining apparatus, which is readily adapted to many different joint configurations, including conventional "lanced" joints as well as a novel leakproof joint.

Further objects of the present invention reside in the provision of a novel leakproof joint for sheet metal, as well as in the provision of a novel method for forming such a joint.

These and other objects, features and advantages of the present invention will become apparent from the subsequent description and the appended claims, taken in conjunction with the accompanying drawings.

BRIEF DESCRIPTION OF THE DRAWINGS

FIG. 1 is a fragmentary front elevational view of an apparatus incorporating the principles of the present invention, shown in its retracted position;

FIG. 2 is a view similar to FIG. 1 but showing the apparatus in its advanced position;

FIG. 3 is a view taken substantially along line 3—3 in FIG. 1;

FIG. 4 is a fragmentary sectional view taken generally along line 4—4 in FIG. 3;

FIG. 5 is a fragmentary sectional view taken generally along line 5—5 in FIG. 3;

FIG. 6 is a perspective view of the die body of the apparatus shown in FIGS. 1-5;

FIG. 7 is an enlarged fragmentary sectional view illustrating the leakproof joint of the present invention at the point of completion of its formation;

FIG. 8 illustrates dies for forming a plurality of different shaped joints in accordance with the present invention;

FIG. 9 is a partially exploded perspective view of an alternative form of a die assembly having universal applicability;

FIG. 10 is a view of a universal punch assembly suited for use with the die assembly of FIG. 9;

FIG. 11 is a fragmentary front elevational view of another embodiment of an apparatus incorporating the principles of the present invention which is applicable to the formation of conventional "lanced" type joints;

FIG. 12 is a side elevational view of the apparatus of FIG. 11;

FIG. 13 is a fragmentary enlarged sectional view of a "lanced" joint formed by the apparatus of FIGS. 11 and 12; and FIG. 14 is a fragmentary sectional view taken generally along line 14—14 in FIG. 13.

DETAILED DESCRIPTION OF THE PREFERRED EMBODIMENTS

With reference to FIGS. 1-6, there is shown a sheet metal joining apparatus generally comprising a die assembly 10 and a punch assembly 12 for joining two pieces of sheet metal indicated at a and b, respectively. Although only two pieces of sheet metal are shown, it is to be understood that more than two pieces may be joined in accordance with the principles of the present invention, depending upon the material in question and the thickness thereof. It is envisioned that the most common materials to be joined by the present invention will include such materials as aluminum, galvanized, brass, steel, etc. sheet stock, both coated and uncoated. The invention is particularly suitable for the joining of different materials because they cannot be welded.

Punch assembly 12 is of conventional construction, including a punch body 14 mounting a circular punch 16 and having a threaded portion 18 for threadably supporting a stripper retainer 20. Disposed within retainer 20 is a stripper 22 biased to the stripping position illustrated in FIG. 1 by means of coil spring 24. Punch 16 preferably has a smooth flat tip, with a small radius at the edge as shown in FIG. 7.

Die assembly 10 comprises cylindrical die body 26 mounted in the usual manner within a support structure 28 which may either be the lower leg of a conventional C-frame clamping device for use in a standard press, or the lower die supporting portion of a small press, such as a press of the type disclosed in applicant's U.S. Pat. No. 3,730,044. Die body 26 is provided at its upper end (as shown) with an integral boss 30 from the opposite sides of which extend four shoulders, each indicated at 32. Die body 26 is centrally bored and at the upper end thereof is provided a bore portion 34 in which is disposed (as by press fit) a hardened pin 36 which acts as an anvil or lower die member.

Pivotally supported on each side of die body 26, by means of roll pins 40 located in apertures 42, is a die portion 38. Each die portion 38 is generally T-shaped in side elevation and is provided with two shoulders 44 engageable with two shoulders 32 on die body 26, so that vertical forces exerted on the die portions are transmitted directly to the die body and are not absorbed by pins 40. Each die portion 38 is relieved at 45 to facilitate limited rotational movement. Die portions 38 are mounted for pivotal movement between the respective positions illustrated in FIGS. 1 and 2, and are maintained in a normally closed position, as shown in FIG. 1, by means of a coil spring 46 acting between downwardly extending integral legs 48 on die portions 38. Spring 46 passes through a suitable aperture 50 extending through boss 30.

When die portions 38 are in their closed position illustrated in FIG. 1, the upper surfaces 52 thereof lie in a common horizontal plane and the abutting faces of the die portions lie in a common vertical plane indicated at 54. In this embodiment die portions 38 are each provided with a complementary semi-circular recess 56 centered on plane 54 and defining, when the die portions are in their closed position, an opening having a shape complementary to that of punch 16. Forces exerted downwardly on die portions 38 by punch 16 acting on the workpieces will not tend to pivot them away from one another because the pivotal axes defined by roll pins 40 are disposed outwardly of the edges of the opening defined by recesses 56. Thus any downward force exerted on the die portions by the punch will tend to close rather than open the die. In this embodiment the edge of the opening defined by recesses 56 should be chamfered, as indicated at 58 (FIGS. 1 and 7), to reduce the chance of fracturing or shearing the workpieces.

In operation, the apparatus is initially in the position illustrated in FIG. 1. To join two or more metal sheets they are first placed in overlapping or face-to-face relationship and thereupon placed into the apparatus in FIG. 1, with the lower surface of the sheet metal assembly disposed on surfaces 52 of die portions 38. Thereafter the press (or whatever apparatus is used) is actuated to cause the punch to move downwardly (as shown) towards sheet metal pieces a and b and die assembly 10. Upon engagement of die 16 and the sheet metal, the latter is caused to be drawn downwardly toward the upper surface of anvil 36, indicated at 60. There is no fracturing or shearing of the metal because of the provision of radius 58 around the periphery of the opening defined by recesses 56 and the clearance between the latter and the punch. The drawing action results directly from the coaction of the punch and the opening in die portions 38 defined by recesses 56. As punch 16 approaches anvil 36 at a distance less than the total combined original thickness of sheet metal pieces a and b, there is a transverse or lateral extrusion of the metal, which results in the formation of a laterally enlarged shape, such as indicated at 62 in FIG. 7, which defines a mechanical interlock between sheet metal pieces a and b. FIG. 7 is not drawn to scale, but is intended to provide a representative illustration of the cross-sectional configuration of the metal forming the joint. The lateral extrusion of sheet material causes die portions 38 to be forced laterally outwardly whereupon they pivot outwardly as best illustrated in FIGS. 2 and 7. A strong, permanent and leakproof joint having been formed, the punch is then withdrawn to the position illustrated in FIG. 1 and the workpiece removed. It is noteworthy that in applicant's apparatus only punch 16 requires actuation, and anvil 36 remains fixed. Upon removal of the workpiece spring 46 causes die portions 38 to move back to their closed position illustrated in FIG. 1.

Shearing or lancing of the sheet metal is avoided with the aforedescribed apparatus by providing radius 58 and an appropriate clearance between punch 16 and the opening defined by recesses 56. This clearance is preferably of uniform width. Although applicant has not conducted tests for optimizing the respective dimensions of the parts, set forth below are formulae which establish dimensions which have been found to provide very satisfactory results:

$$P = 2(M1 + M2)(+/-20\%)$$

$$D = P + 0.8(M1 + M2)$$

$$T = 0.2(1.2(M1 + M2))$$

Where:
P = punch diameter
D = die diameter
M1 = top metal thickness
M2 = bottom metal thickness
T = total metal thickness at center of joint These relationships have been found to be a satisfactory starting point. Once the punch diameters are chosen and the apparatus assembled and tested, satisfactory results can be obtained for the materials being joined by adjusting the bottom anvil height using the standard "shut heighth" adjustment (not shown) provided on conventional small presses and C-frames (i.e., the distance between the bottom of the punch and the anvil when the press is at the end of its downward stroke).

Although the apparatus of the first embodiment illustrates the use of a circular punch other shapes may be used, depending upon the application and the strength required. For example, there are shown in FIG. 8 four different configurations which might be used. Die portions 38a are provided with three circular apertures 64 for those applications in which either the anti-rotation characteristics or the strength characteristics desired require more than a single circular joint. Die portions 38b have a diamond-shaped aperture 66 which is capable of providing a joint of strength comparable to that of the first embodiment, but yielding better anti-rotational characteristics. Die portions 38c have a triangular opening 68 which should give results similar to those of the diamond-shaped opening 66. Die portions 38d have an oval-shaped opening 70 providing a relatively large joint of high strength and high anti-rotational characteristics. Regardless of cross-sectional shape, the interior wall of the drawn portion of the upper piece of sheet metal will be generally cylindrical in configuration.

In FIG. 9 there is illustrated a universal type die body 26a which is virtually identical to die body 26 of the first embodiment but is provided with a plurality of parallel vertically aligned holes 72, 74 and 76 adapted to receive hardened anvil pins 78, 80 and 82, respectively, in a press fit relationship. It is envisioned that in applications where a single circular joint is sufficient, pins 78 and 82 may be removed from the die body, thus reducing energy requirements. On the other hand, if greater strength or anti-rotation characteristics are desired, then one or two more additional pins may be inserted in the proper hole to provide additional joining capability. The die portions which would be affixed to die body 26a would have a top configuration similar to that shown at 38a in FIG. 8, with openings 64 being designed to cooperate with pins 78, 80 and 82.

In FIG. 10 there is illustrated the lower portion of a punch which may be utilized with the universal die body of FIG. 9. The punch body, which can be conventional in all other respects, is indicated at 84 and is provided with a plurality of press-fit hardened steel punch pins 86, 88 and 90 adapted to coact with anvils 78, 80 and 82, respectively, in the same manner that punch 16 coacts with anvil 36 in the first embodiment. Suitable apertures 92 may be provided in the punch body 84 to permit removal of the punches if it is desired to replace same or reduce the number thereof for a particular application. The punch pins and anvils can be non-circular in cross-section if desired.

In FIGS. 11 and 12 there is illustrated a slightly modified version of the die assembly and punch which is capable of forming conventional "lanced" type joints, such as illustrated in FIGS. 13 and 14. The die assembly 10a of this embodiment includes die body 26b and is substantially the same as die assembly 10 of the first embodiment (the same reference numerals are used to indicate identical parts), differing in that die portions 38e are not provided with recesses to define a punch receiving opening, but instead are provided with cutting edges 94. In addition, the anvil comprises an integrally formed continuous flat generally horizontal surface 96 extending the full length of cutting edges 94. Punch 16a of this embodiment is generally spade-shaped, having a width substantially the same as the distance between cutting edges 94 and having chamfered corners 98.

In FIGS. 13 and 14 sheet metal pieces c and d are shown joined utilizing the apparatus of FIGS. 11 and 12. As the punch moves downwardly toward the die assembly, projections 100 and 102 are lanced out of sheet metal pieces c and d, respectively. These projections remain integrally attached to the parent metal at the ends thereof, as best shown in FIG. 13, but are totally severed from the material along their sides as shown at 104 in FIG. 14. Continued advancement of the punch toward the anvil causes a transverse or lateral extruding of projections 100 and 102 to create the enlarged section shown in FIG. 14, which provides the necessary mechanical interlock to give the joint its integrity. As will be appreciated, because there is a lancing of the sheet metal a joint of this type is not leak-proof. As the metal of the projections is extruded laterally it causes die portions 38e to pivot apart to accommodate the extrusion and thereby define the interlock. The use of applicant's die assembly has been found to very satisfactorily permit the formation of this type of joint without the use of moving anvils and complex sliding dies.

Thus there is disclosed in the above description and in the drawings an apparatus, method and joint which fully and effectively accomplish the objectives thereof; however, it will be apparent that variations and modifications of the disclosed embodiments may be made without departing from the principles of the invention or the scope of the appended claims.

What is claimed is:

1. A method of joining sheet metal in a single operation comprising:
    (a) assembling at least two pieces of sheet metal in an overlapping relationship;
    (b) positioning a die against one outside face of the sheet metal assembly, said die including a cavity defined by an anvil forming the bottom surface of said cavity and by opposed laterally expansible side wall members mounted by pivot means for lateral pivotal movement relative to said cavity;
    (c) moving a punch against the opposite outside face of the sheet metal assembly in a longitudinal direction toward the die cavity in a manner to draw both pieces of sheet metal into the die cavity toward said anvil to form a cup-shaped portion with at least one side wall and a bottom wall without shearing any portion of the sheet metal, said drawing of said pieces of sheet metal tending initially to bias said side wall members toward one another;
    (d) continuing movement of the punch in said longitudinal direction toward said anvil to compress said bottom wall of said cup-shaped portion of the sheet metal pieces therebetween and thereby extrude said bottom wall in a lateral direction while at the same time permitting said side wall members to move apart without restricting such lateral extrusion, whereby there is formed a laterally enlarged shape which mechanically interlocks the two pieces of sheet metal,
        (i) said lateral extrusion occurring without fracture of any portion of the sheet metal, and
        (ii) said side wall members moving apart sufficiently easily to prevent any extrusion in said longitudinal direction;
    (e) longitudinally supporting said side wall members independently of said pivot means on a lateral portion of said side wall members remote from said cavity during longitudinal movement of said punch; and
    (f) withdrawing the punch from the joined sheet metal assembly.

2. The method as claimed in claim 1, wherein said anvil is maintained in a fixed position.

3. The method as claimed in claim 1, further comprising the step of reducing the original thickness of both pieces of sheet metal during drawing thereof.

4. The method as claimed in claim 1, further comprising the steps of simultaneously forming a plurality of closely spaced joints between the pieces of sheet metal.

5. The method as claimed in claim 1, wherein said side walls enclose said cavity for approximately 360 degrees.

6. The method as claimed in claim 1, wherein said cavity is circular in cross-section.

7. The method as claimed in claim 1, wherein said cavity is non-circular in cross-section.

* * * * *